United States Patent [19]
Cipolli et al.

[11] Patent Number: 5,302,641
[45] Date of Patent: Apr. 12, 1994

[54] SELF-EXTINGUISHING POLYMERIC COMPOSITIONS

[75] Inventors: Roberto Cipolli, Novara; Roberto Oriani, Milan; Enrico Masarati, Castelnuovo Valtidone; Gilberto Nucida, San Giuliano Milanese, all of Italy

[73] Assignee: Ministero Dell 'Universita' e Della Ricerca Scientifica e Tecnologica, Rome, Italy

[21] Appl. No.: 978,494

[22] Filed: Nov. 13, 1992

[30] Foreign Application Priority Data

Nov. 14, 1991 [IT] Italy .............. MI91 A 003039

[51] Int. Cl.$^5$ ............................................. C08K 5/3492
[52] U.S. Cl. .................................. 524/100; 524/415; 524/416
[58] Field of Search ................... 524/100, 416, 415

[56] References Cited

U.S. PATENT DOCUMENTS

| | | | |
|---|---|---|---|
| 4,244,858 | 1/1981 | Tacke et al. | 524/416 |
| 4,312,805 | 1/1982 | Bertelli et al. | 524/416 |
| 4,347,334 | 8/1982 | Staendeke et al. | 524/416 |
| 4,504,610 | 3/1985 | Fontanelli et al. | 524/416 |
| 4,579,894 | 4/1986 | Bertelli et al. | 524/416 |
| 4,812,499 | 3/1989 | Cipriani et al. | 524/416 |
| 5,096,961 | 3/1992 | Eberspach | 524/416 |
| 5,153,245 | 10/1992 | Cipolli et al. | 524/416 |

FOREIGN PATENT DOCUMENTS

| | | |
|---|---|---|
| 0014463 | 8/1980 | European Pat. Off. . |
| 0326082 | 8/1989 | European Pat. Off. . |
| 0391336 | 10/1990 | European Pat. Off. . |
| 1286661 | 8/1972 | United Kingdom . |

*Primary Examiner*—Kriellion S. Morgan
*Attorney, Agent, or Firm*—Oblon, Spivak, McClelland, Maier & Neustadt

[57] ABSTRACT

Self-extinguishing thermoplastic polymeric compositions comprising a phosphorus derivative and condensation compounds obtained by means of the polymerization of polyaminic mixtures essentially constituted by derivatives of 2,4,6-triamino-1,3,5-triazine, having the general formula (I):

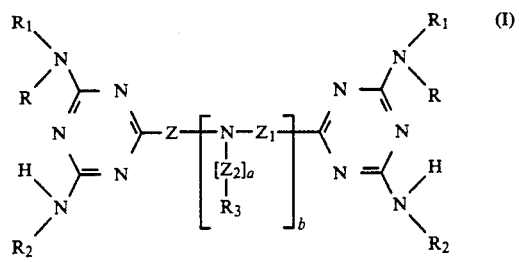

with aldehydes, preferably formaldehyde.

15 Claims, No Drawings

SELF-EXTINGUISHING POLYMERIC COMPOSITIONS

The present invention relates to self-extinguishing polymeric compositions either based on thermoplastic polymers or on polymers endowed with elastomeric properties, in particular olefinic polymers or copolymers, containing aminoplastic resins in combination with ammonium or amine phosphates and/or phosphonates.

In the art several solutions are known in order to reduce or eliminate combustibility of polymers. Some of such solutions are based on the use of metal compounds, in particular compounds of antimony, bismuth or arsenic, in combination with partially halogenated, thermally unstable organic compounds, such as chlorinated paraffinic waxes.

Other solutions are based on the use of substances capable of causing intumescence. The formulations of intumescent type are generally constituted by the polymer and at least three main additives: one essentially phosphorus containing additive, whose purpose is of forming, during the combustion, a semisolid, impermeable glassy layer essentially constituted by polyphosphoric acid, and of initiating the process of intumescence formation; a second., nitrogen containing, additive, which performs the task of foaming agent; and a third, carbon containing, additive, which acts as a carbon donor, in order to form an insulating, cellular carbonaceous layer (char) between the polymer and the flame.

Examples of this type of intumescent formulations are those as reported in the following patents: U.S. Pat. No. 3,810,862 (Phillips Petroleum Co.), based on metamine, pentaerythritol and ammonium polyphosphate, U.S. Pat. No. 4,727,102 (Vamp S.r.l), based on metamine cyanurate, a hydroxyalkyl derivative of isocyanuric acid and ammonium polyphosphate, and published patent application WO 85/05626 (Plascoat U.K. Limited), based on various phosphorus and nitrogen compounds among which, in particular, a combination of metamine phosphate, pentaerythritol and ammonium polyphosphate may be cited.

In more recent formulations, together with the use of an organic or inorganic phosphorus compound, a nitrogen containing organic compound was used, in general an aminoplastic resin obtained by means of the condensation of urea, metamine or dicyandiamide with formaldehyde.

Examples of double additive formulations are those as reported in U.S. Pat. No. 4,504,610 (Montedison S.p.A.), based on oligomeric derivatives of 1,3,5-triazine and ammonium polyphosphate, and European patent 14,463 (Montedison S.p.A.), based on organic compounds selected from benzylguanamine and reaction products of aldehydes with various nitrogen-containing cyclic compounds, in particular benzylguanamineformaldehyde copolymers, and ammonium polyphosphate.

Self-extinguishing compositions can also be obtained by using single component additives, containing both nitrogen and phosphorus in their organic molecule, as disclosed in U.S. Pat. No. 4,201,705 (Borg-Warner Corp.).

These flame retardant, intumescent systems endow the polymer which contains them with the property of giving rise to the formation of a carbonaceous residue following a fire or the application of a flame. This type of flame retardant systems display a number of advantages: absence of phenomena of corrosion in the machinery on which polymers are processed; lower smoke emission than as of those systems which contain metal compounds and halogenated hydrocarbons; and, above all, the possibility of endowing the polymers with satisfactory flame retardant properties with a smaller amount of total additive, and, therefore, without an excessive decay in mechanical properties of the same polymers.

The present applicant has found now that excellent characteristics of self-extinguishment can be given to the polymers by means of the use of a novel class of simple structure aminoplastic resins obtained from the polycondensation with aldehydes, preferably formaldehyde, of polyaminic compositions essentially constituted by derivatives of 2,4,6-triamino-1,3,5-triazine, modified with a suitable substituent selected from those disclosed in the following.

As mentioned above, in the art (European patent EP 14,463) reaction products of aldehydes with various nitrogenous cyclic compounds are known which can be used, together with ammonium phosphate, for self-extinguishing compositions in various polymeric matrices, in particular polyolefins.

Although such compounds, such as, for example, ethyleneurea-formaldehyde copolymer, display a good activity as flame retardant agents, they supply the polymeric compositions which contain them with a limited heat stability both during their processing steps (extrusion and moulding) and to thermooxidation, and furthermore require, in order to perform their action, a rather high content of phosphorus containing co-additive.

Other compounds, such as, e.g.,, melamine-formaldehyde copolymer, result to be unable to endow the above said polymers with self-extinguishing characteristics.

Also the use of mixed compounds, such as, e.g., ethyleneurea-melamine-formaldehyde terpolymer, is not enough in order to cause the polymeric compositions to reach satisfactory values of heat stability, although it contributes to improve it.

On the contrary, the additives according to the present invention, besides requiring a smaller content of phosphorus containing co-additive, make it possible polymeric compositions to be obtained which are endowed with good thermal stability both to thermooxidation and during the polymer processing step, thus making it possible the compounding process to be carried out at higher temperatures than as allowed by the aminoplastic resins known from the prior art.

Besides showing good stability to heating, thus retaining a high activity as flame retardants also after undergoing the high temperature fabrication processes of the polymeric compositions which contain them, said additives display a complete water insolubility.

Finally, the polymeric compositions according to the present invention display the advantage that they, in the case of a fire, give rise to a very moderate and non obscuring smoke emission.

Therefore, the subject matter of the present invention are the self-extinguishing compositions comprising:
(a) from 91 to 40 parts by weight of a thermoplastic polymer, or of a polymer endowed with elastomeric properties;
(b) from 6 to 33, preferably from 8 to 30, parts by weight of one or more ammonium or amine phosphate and/or phosphonates;

(c) from 3 to 27, preferably from 4 to 20, parts by weight of one or more aminoplastic resin(s), obtained by means of the polymerization of a mixture comprising:
  (1) from 0 to 50 parts by weight of one or more polyaminic derivatives;
  (2) from 50 to 100 parts by weight of one or more derivatives of 2,4,6-triamino-1,3,5-triazine having the general formula (I):

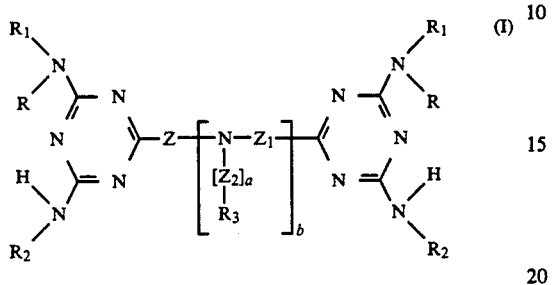

with formaldehyde or a mixture of formaldehyde and an aldehyde having the general formula (II):

wherein the aldehyde having the general formula (II) can be present in an amount of up to 20% by mol, and wherein:
the radicals from R to $R_2$, which may be the same, or different from each other, and may have different meanings on each triazinic ring, are: H; $C_{1-18}$ alkyl; $C_{2-C8}$ alkenyl; $C_6-C_{16}$ cycloalkyl or alkylcycloalkyl, possibly substituted with a hydroxy or $C_1-C_4$ hydroxyalkyl function;

$-CH_2-[-C_mH_{2m}-]-O-R_5$ $-CH_2-[-C_pH_{2p}-]-N(R_6)_2$ wherein
m = an integer comprising within the range of from 1 to 7, preferably from 1 to 3;
p = an integer comprising within the range of from 1 to 5;
$R_5$ = H; $C_1-C_8$ alkyl, preferably H or $C_1-C_4$ alkyl; $C_2-C_6$ alkenyl;

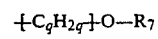

wherein q is an integer comprised within the range of from 1 to 4 and $R_7$ is H or $C_1-C_4$ alkyl; $C_6-C_{12}$ cycloalkyl or alkylcycloalkyl;
the radicals $R_6$, which may be the same, or different from each other, are: H, $C_1-C_8$ alkyl; $C_2-C_6$ alkenyl; $C_6-C_{12}$ cycloalkyl or alkylcycloalkyl; $C_1-C_4$ hydroxyalkyl; or the moiety:

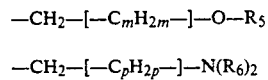

is replaced by a heterocyclic radical linked to the alkyl chain through the nitrogen atom, and possibly containing another heteroatom preferably selected from O, S, N; or in the general formula (I) the moiety:

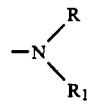

is replaced by a heterocyclic radical linked to the triazinic ring through the nitrogen atom, and possibly containing another heteroatom preferably selected from O, S, N;
a is 0 (zero) or 1;
b is 0 (zero) or an integer comprised within the range of from 1 to 5;
$R_3$ is hydrogen or:

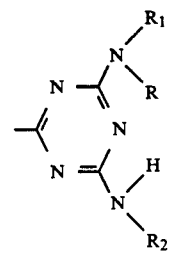

and its meaning may vary within each repeating unit; when b is 0 (zero), Z is a divalent radical falling within the scope of one of the following formulas:

wherein the radicals $R_8$, which may be the same or different from each other, are hydrogen or $C_1-C_4$ alkyl;

wherein r is an integer comprised within the range of from 2 to 14; $R_9$ is hydrogen $C_1-C_4$ alkyl; $C_2-C_6$ alkenyl; $C_1-C_4$ hydroxyalkyl;

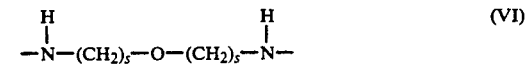

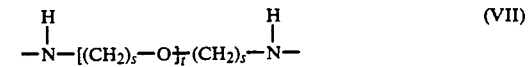

wherein s is an integer comprised within the range of from 2 to 5 and t is an integer comprised within the range of from 1 to 3;

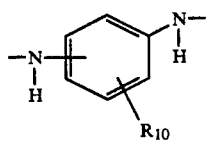
(VIII)

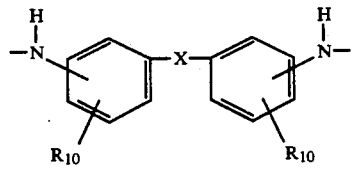
(IX)

wherein:
X is a direct C—C bond; O; S; S—S; SO; SO$_2$; NH; NHSO$_2$; NHCO; N=N; CH$_2$;
R$_{10}$ is hydrogen; hydroxy; C$_1$-C$_4$ alkyl; C$_1$-C$_4$ alkoxy;

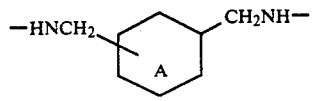
(X)

wherein A may be a saturated or unsaturated ring;

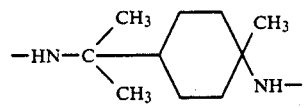
(XI)

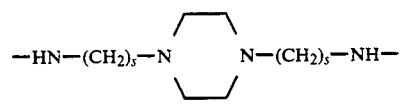
(XII)

wherein s has the above defined meaning;
when, on the contrary, b is an integer comprised within the range of from 1 to 5, the moiety:

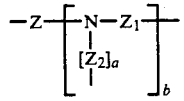

is a multivalent moiety falling within the scope of one of the following formulas:

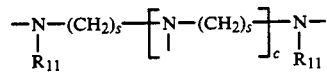
(XIII)

wherein:
R$_{11}$ is hydrogen or C$_1$-C$_4$ alkyl;
c is an integer comprised within the range of from 1 to 5;
the indexes s, which may be the same, or different from each other, have the same meaning as defined hereinabove;

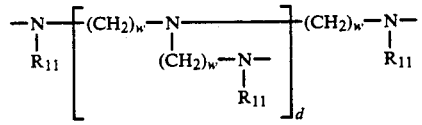
(XIV)

wherein:
R$_{11}$ has the meaning as defined hereinabove;
w is an integer comprised within the range of from 2 to 4;
d is either 1 or 2.

R$_4$ is C$_1$-C$_8$ alkyl; C$_2$-C$_6$ alkenyl; C$_6$-C$_{12}$ cycloalkyl; C$_6$-C$_{12}$ aryl, possibly substituted with one or more C$_1$-C$_4$ alkyl radicals; C$_7$-C$_{16}$ aralkyl; C$_8$-C$_{12}$ aralkenyl.

According to a preferred form of practical embodiment of the aminoplastic resins according to the present invention, the polyaminic derivative is selected from compounds containing the 1,3,5-triazine ring, or at least one >C=O and/or >C=S moiety.

Also those derivatives having an asymmetrical structure, in the sense that the radicals R, R$_1$ and R$_2$ may have different meanings on each triazinic ring, fall within the scope of general formula (I).

Particularly preferred are those polymeric compositions in which the (c) component is obtained by means of polycondensation with formaldehyde or those in which R$_2$ and R$_3$, in general formula (I), are equal to hydrogen.

Preferably, the (c) component is selected from polycondensates obtained by means of resinification of the only derivatives of general formula (I).

The same self-extinguishing characteristics are obtained by blending the polycondensation products obtained by separately resinifying the components (1) and (2) with aldehydes.

Examples of radicals from R to R$_2$ in general formula (I) are: methyl; ethyl propyl; isopropyl; n-butyl; isobutyl; tert -butyl; n-pentyl; isopentyl; n-hexyl; tert-hexyl; octyl; tert -octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino) ethyl; 3-(N,N-dimethylamino) propyl; 4-(N,N-dimethylamino) butyl; 5-(N,N-dimethylamino) pentyl; 4-(N,N-diethylamino) butyl; 5-(N,N-diethylamino) pentyl; 5-(N,N-diisopropylamino)pentyl; 3-(N-ethylamino) propyl; 4-(N-methylamino)butyl; 4-(N,N-dipropylamino) butyl; 2-(N,N-diisopropylamino)-ethyl; 6-(N-hexenylamino) hexyl; 2-(N-ethenylamino)-ethyl; 2-(N-cyclohexylamino) ethyl; 2-(N-2-hydroxyethylamino) ethyl; 2-(2-hydroxyethoxy) ethyl; 2-(2-methoxyethoxy) ethyl; 6-(N-propylamino) hexyl; and so forth.

Examples of heterocyclic radicals which may replace the moiety:

in general formula (I) are: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

are: aziridine; pyrrolidine; piperidine; morpholine; thiomorpholine; piperazine; 4-methylpiperazine; 4-ethylpiperazine; and so forth.

Examples of divalent -Z- radicals are those which derive, by elimination of a hydrogen atom from each aminic moiety, from the following diaminic compounds: piperazine 2-methyl piperazine; 2,5-dimethylpiperazine 2,3,5,6-tetramethyl piperazine; 2-ethylpiperazine; 2,5-diethyl piperazine; 1,2-diaminoethane; 1,3-diaminopropane; 1,4-diaminobutane; 1,5-diaminopentane; 1,6-diaminohexane; 1,8-diaminooctane; 1,10-diaminodecane; 1,12-diaminododecane; N,N-dimethyl-1,2-diaminoethane; N-methyl-1,3-diaminopropane; N-ethyl-1,2-diaminoethane; N-isopropyl-1,2-diaminoethane; N-(2-hydroxyethyl)-1,2-diaminoethane; N,N'-bis (2-hydroxyethyl)-1,2-diaminoethane; N-(2-hydroxyethyl)-1,3-diaminopropane; N-hexenyl-1,6-diaminohexane; N,N'-diethyl-1,4-diamino-2-butene; 2,5-diamino-3-hexene; 2-aminoethyl-ether; (2-aminoethoxy) methylether; 1,2-bis-(2-aminoethyoxy)ethane; 1,3-diaminobenzene; 1,4-diaminobenzene; 2,4-diaminotoluene; 2,4-diaminoanisole; 2,4-diaminophenol; 4-aminophenylether; 4,4'-methylenedianiline; 4,4'-diaminobenzanilide; 3-aminophenylsulfone; 4-aminophenylsulfone; 4-aminophenylsulfoxide; 4-aminophenyldisulfide; 1,3-bis (aminomethyl) benzene; 1,4-bis (aminomethyt) benzene; 1,3-bis (aminomethyl)cyclohexane; 1,8-diamino-p-mentane; 1,4-bis (2-aminoethyl) piperazine; 1,4-bis (3-aminopropyl) piperazine; 1,4-bis (4-aminobutyl) piperazine; 1,4-bis,(5-aminopentyl) piperazine; and so forth.

Examples of multivalent radicals:

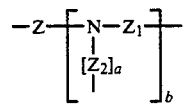

are those which derive, by elimination of a hydrogen atom from each reacted aminogroup, from the following polyaminic compounds: bis (2-aminoethyl) amine; bis (3-aminopropyl)amine; bis (4-aminobutyl) amine; bis (5-aminopentyl)amine; bis [2-(N-methylamino) ethyl] amine; 2-N-butylbis (2-aminoethyl) amine; bis [3-(N-methylamino)propyl] amine; N-(3-aminopropyl)-1,4-diaminobutane; N-(3-aminopropyl)-1,5-diaminopentane; N-(4-aminobutyl)-1,5-diaminopentane; tris (2-aminoethyl) amine; tris (3-aminopropyl) amine; tris (4-aminobutyl) amine; tris [2-(N-ethylamino) ethyl] amine; N,N'-bis (2-aminoethyl)-1,2-diaminoethane; N,N'-bis (3-aminopropyl)-1,3-diaminopropane; N,N'-bis (2-aminoethyl)-1,3 -diaminopropane; N,N'-bis (3-aminopropyl)-1,2-diaminoethane; N,N'-bis (3-aminopropyl)-1,4-diaminobutane; bis [2-(2-aminoethyl) aminoethyl] amine; N,N'-bis [2-(2-aminoethyl) aminoethyl]-1,2diaminoethane; N,N'-bis [3-(2-aminoethyl) aminopropyl]-1,2-diaminoethane; N,N,N',N'-tetrakis (2-aminoethyl)-1,2-diaminoethane; and so forth.

By "formaldehyde", as this term is used in the instant disclosure and in the appended claims, any forms are meant, in which formaldehyde is usually marketed: aqueous solution, metaformaldehyde, paraformaldehyde.

Examples for $R_4$ radical in general formula (II) are: methyl; ethyl; n-propyl; isopropyl; n-butyl; isobutyl; tert -butyl; n-pentyl; isopentyl; n-hexyl; n-heptyl; isoheptyl; n-octyl; ethenyl; propenyl; isobutenyl; sec -butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; 2-phenylethenyl; and so forth.

Examples of polyaminic derivatives are: urea; ethyleneurea; propyleneurea; thiourea; ethylenethiourea; metamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

The aminoplastic resins according to the present invention can be synthesized as follows:

(a) by reacting in a suitable solvent (such as, e.g., water, methyl alcohol, ethyl alcohol, or their mixtures, and so forth), the derivative of 2,4,6-triamino-1,3,5-triazine having the general formula (I), either mixed or not mixed with the polyaminic derivative, with formaldehyde or a mixture of formaldehyde and an aldehyde of general formula (II). The molar ratio of the derivative of general formula (I), or of its mixture with the polyaminic derivative, to formaldehyde, or to the mixture of formaldehyde with the aldehyde of general formula (II), is comprised within the range of from 1:1 to 1:12.

The reaction is carried out at a pH value comprised within the range of from 7 to 12, possibly obtained by adding an alkali (such as, for example, potassium carbonate, sodium carbonate, sodium hydroxide, and so forth), at temperatures comprised within the range of from 20° C. up to the boiling point of the solvent, until a finely subdivided dispersion is obtained;

(b) causing the resulting reaction product, constituted by the alkylol derivative, to turn into a resin by acidifying it to a pH value comprised within the range of from 1 to 5, by means of the addition of an acid (such as, e.g., sulfuric acid, hydrochloric acid, phosphoric acid, and so forth) and heating it to, and keeping it at, a temperature comprised within the range of from 40° C., up to the boiling point of the solvent. The resulting dispersion is kept further stirred at the selected temperature, during the necessary time to complete the resinification process, preferably of from 1 to 12 hours. The residual acidity of the resulting mixture is then neutralized with a base selected from those as suggested hereinabove, and the resulting product is filtered off.

The resin is first dried at 100° C., then is submitted to thermal treatment for some hours, preferably of from 1 to 3 hours, in a vacuum oven at 150° C.

In general good quality aminoplastic resins are obtained as white crystalline powders, which are insoluble in water and can be used in self-extinguishing polymeric compositions without any further purification.

An alternative synthesis method consists in causing the reactions of the above (a) and (b) steps to take place in one single step, at a pH value comprised within the range of from 1 to 5, and at a higher temperature than 40° C.

Many of derivatives of 2,4,6-triamino-1,3,5-triazine of general formula (I) are known; they can anyway be easily synthesized according to as disclosed in European Patent application publication No. 415 371, to the same applicant's name.

Among phosphates, those ammonium polyphosphates are preferred which are encompassed by the general formula $$(NH_4)_{n+2} P_n O_{3n+1}$$

in which n is an integer equal to, or higher than, 2; the molecular weight of polyphosphates should preferably be high enough in order to secure a low water solubility.

For indicative purposes, n is preferably comprised within the range of from 2 to 500.

The composition of polyphosphates falling within the scope of the above indicated formula, in which n is a large enough number, and preferably comprised within the range of from 50 to 500, is practically that composition which corresponds to the formula of metaphosphates $$(NH_4PO_3)_n.$$

An example of such polyphosphates is the product known under the trade name "Exolit 422" (produced and traded by Hoechst) and having the composition $(NH_4PO_3)_n$ in which n is higher than 50; another example is the D product known under the trade name "Phos-Check P/40" (Monsanto Chemical), and having a similar composition.

Another polyphosphate which can be advantageously used, above all owing to its reduced water solubility, is the product known under the trade name "Exolit 462" (produced and traded by Hoechst), and corresponding to Exolit 422 microencapsulated in melamine-formaldehyde resin.

Other phosphates which may be used are those deriving from amines, such as, e.g., dimethylammonium or diethylammonium phosphate, ethylenediamine phosphate, or metamine ortho- or pyrophosphate.

Among phosphonates, extremely good results were obtained by using (mono- or polysubstituted) ammonium phosphonates derived from mono- and poly-phosphonic acids, examples of which are the following:

ethane-1 1 2-triphosphonic acid; ethane-2-hydroxy-1,1,2-triphosphonic acid; propane-1,2,3-triphosphonic acid; methylphosphonic acid; ethylphosphonic acid; n-propylphosphonic acid; n-butylphosphonic acid; phenylphosphonic acid; ethane-1-amino -1,1-diphosphonic acid; ethane-1- hydroxy -1,1-diphosphonic acid; dodecane-1-hydroxy-1,1-diphosphonic acid; phosphonoacetic acid; 2-phosphonopropionic acid; 3-phosphonopropionic acid; 2-phosphonobutyric acid; 4-phosphonobutyric acid; amino tris (methylenephosphonic) acid; ethylenediaminotetra (methylenephosphonic) acid; hexamethylenediaminotetra (methylenephosphonic) acid; diethylenetriaminopenta(methylene phosphonic) acid; and so forth.

Among those polymers which can be used in the composition of the present invention, preferred are polymers or copolymers of olefins having the general formula $$R-CH=CH_2$$

wherein R is a hydrogen atom or a $C_1-C_8$ alkyl or aryl radical, in particular:
1. isotactic or prevailingly isotactic polypropylene;
2. HDPE, LLDPE, LDPE polyethylene;
3. crystalline propylene copolymers with minor proportions of ethylene and/or other alpha-olefins, such as, e.g., 1-butene, 1-hexene, 1-octene, 4-methyl-1-pentene;
4. heterophasic compositions comprising: (A) a homopolymeric propylene fraction, or one of such copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene;
5. elastomeric ethylene copolymers with alpha-olefins, possibly containing minor proportions of a diene. Examples of dienes which are more commonly contained in the above said elastomeric copolymers are butadiene, ethylidene-norbornene, hexadiene 1–4. Among polymers of olefins having formula $$R-CH=CH_2$$

in which R is an aryl radical, "crystal" polystyrene and high-impact polystyrene are preferred. Other examples of polymers which may commonly be used are acrylonitrile/butadiene/styrene (ABS) and styrene/acrylonitrile (SAN) copolymers; (polyester and polyether) polyurethane; poly (ethylene terephthalate); poly (butylene terephthalate); polyamides; and so forth.

The self-extinguishing compositions according to the present invention can be prepared according to well-known methods: for example, ammonium or amine phosphate and/or phosphonate is first intimately mixed with one or more aminoplastic resin(s), the resulting blend is finely ground (preferably down to a smaller particle size than 70 micrometers), and the resulting mixture is added to the polymer in a turbomixer, in order to form a homogeneous compound which is extruded and pelletized. The resulting granular product can be fabricated and converted into various articles of manufacture according to any of the well-known molding techniques.

The flame-retardant additives according to the present invention are suitable for use also in the field of flame-retarding paints.

Condensation compounds obtained by polimerising with aldehydes, preferably formaldehyde, the melaminic derivatives of general formula (I), either containing or not containing polyaminic derivatives, not cited in the examples, but which can be advantageously used as well in the self-extinguishing polymeric compositions according to the present invention, are those as reported in following Table 1, in which R₃, when present,
is substituted by the triazinic ring of formula:
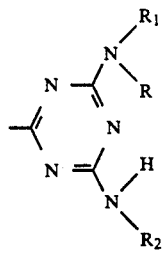

TABLE 1

Derivative of general formula (I)

| COMPOUND N° | R—N—R₁ | R₂ | $-Z+[N-Z_1]_b$ $[Z_2]_a$ | Polyaminic derivative Designation | % by weight | $R_4$—CHO $R_4$ | Mol % | Molar ratio Polyamines/ aldehydes |
|---|---|---|---|---|---|---|---|---|
| 1 | cyclohexyl | H | piperazine (N—⟨ ⟩—N) | — | — | — | — | 1:4 |
| 2 | morpholine | H | para-phenylenediamine (HN—C₆H₄—NH) | — | — | — | — | 1:3.5 |
| 3 | H | H | 2,5-dimethylpiperazine (CH₃-substituted) | Benzo-guanamine | 20 | — | — | 1:2.5 |
| 4 | (CH₂)₂OCH₃ | (CH₂)₂OCH₃ | —HN(CH₂)₃NH— | — | — | — | — | 1:2 |
| 5 | N-methylpiperazine | H | piperazine (N—⟨ ⟩—N) | — | — | C₂H₅ | 10 | 1:5 |
| 6 | (CH₂)₅OH | H | piperazine (N—⟨ ⟩—N) | Ethylene-urea | 25 | — | — | 1:2 |
| 7 | (CH₂)₃OCH₃ | (CH₂)₃OCH₃ | —NCH₂CH₂N— with CH₃, CH₃ | — | — | — | — | 1:4 |
| 8 | morpholine | H | —HN(CH₂)₃N⟨piperazine⟩N(CH₂)₃NH— HN(CH₂)₃N | — | — | — | — | 1:4 |

TABLE 1-continued

Derivative of general formula (I)

$$-Z\left[\begin{array}{c}N-Z_1\\ |\\ [Z_2]_a\end{array}\right]_b$$

| COMPOUND N° | R—N—R₁ | R₂ | Polyaminic derivative Designation | % by weight | R₄—CHO R₄ | Mol % | Molar ratio Polyamines/aldehydes |
|---|---|---|---|---|---|---|---|
| 9 | (CH₂)₃N-morpholine | H | piperazine | — | — | — | 1:4 |
| 10 | morpholine | H | —HN(CH₂CH₂O)₂—CH₂CH₂NH— | — | — | — | 1:2.5 |
| 11 | (CH₂)₂OCH₃ | H | —HNC₂H₄—N(CH₃)—C₂H₄NH— | — | — | — | 1:6 |
| 12 | morpholine | H | —NHCH₂CH₂NH— | — | — | — | 1:3.5 |
| 13 | thiomorpholine | H | piperazine | — | — | — | 1:6 |
| 14 | CH₂CH₂OH | H | 1,4-dimethyl-cyclohexane diamine derivative | — | i-C₄H₉ | 8 | 1:5 |
| 15 | CH₂CH₂OCH₃ | H | —HN(CH₂)₄NH— | — | — | — | 1:4 |
| 16 | piperazine (N—H) | H | —HNCH₂CH₂NH— | — | — | — | 1:8 |
| 17 | H | H | N(CH₂CH₂NH—)₃ | — | — | — | 1:8 |

Aceto-guanamine: 30 (compound 11)
Melamine: 40 (compound 15)

TABLE 1-continued
Derivative of general formula (I)
$$-Z-\left[N-Z_1\atop[Z_2]_a\right]_b$$
| COMPOUND N° | R—N—R₁ | | R₂ | [structure] | Polyaminic derivative Designation | % by weight | R₄ | R₄—CHO Mol % | Molar ratio Polyamines/aldehydes |
|---|---|---|---|---|---|---|---|---|---|
| | R | R₁ | | | | | | | |
| 18 | H | H | H | 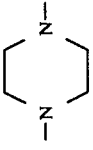 | Benzyl-guanamine | 35 | — | — | 1:3.5 |
| 19 | H | 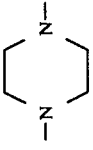 | H | — | — | — | n-C₄H₉ | 5 | 1:2.5 |
| 20 | H | H | H | 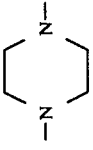 | Melamine | 20 | i-C₃H₇ | 8 | 1:3 |
| 21 | H | 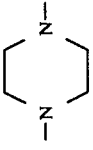 | H | —HNCH₂CH₂NH— | — | — | — | — | 1:4 |
| 22 | H | H | H | —HNC₂H₄—N—C₂H₄NH—<br>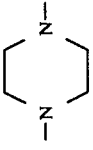 | Piperazine-2,5-dione | 20 | — | — | 1:8 |
| 23 | H | 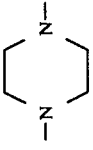 | H | 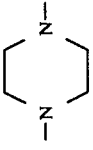 | Succino-guanamine | 18 | — | — | 1:4.5 |
| 24 | n-C₄H₉ | H | n-C₄H₉ | 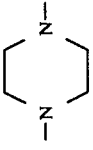 | — | — | — | — | 1:4 |

EXAMPLE 1

184.5 g of cyanuric chloride and 1300 cm³ of methylene chloride are charged to a reactor of 3 liters of capacity, equipped with stirrer, thermometer, addition funnel, refluxing condenser and cooling bath.

With cooling from the outside, 75 g of 2-methoxy ethylamine and 40 g of sodium hydroxide dissolved in 150 cm³ of water are added simultaneously, within a 3 hour time, with the pH value of the mixture being kept comprised within the range of from 5 to 7, and the temperature being kept comprised within the range of from 0 to 3° C.

The reaction mixture is kept at said temperature of 0°–3° C. for a further 3 hours, then the aqueous phase is separated.

The organic solution is treated with two portions of 200 cm³ each, of water, with the aqueous phase being separated each time.

By distillation of methylene chloride, 217,5 g of intermediate (XV):

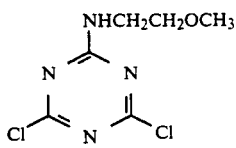

are obtained as a white crystalline powder with m.p.=73°–75° C. (m.p.=melting point) and a chlorine content of 31.68% (theoretical chlorine content: 31.84%).

400 cm³ of acetone and 133.8 g of intermediate (XV) are charged to a reactor of 1 liter, of capacity equipped with stirrer, thermometer, addition funnel refluxing condenser and heating bath.

The reaction mixture is heated up to 40° C. with stirring, until a solution is obtained, then, with the temperature being kept constant at 40° C., 102 g of an aqueous solution of ammonia at 30% by weight are added during a 30 minute time.

The reaction mixture is subsequently heated up to 45° C., and is kept 4 hours at that temperature.

After cooling down to 10° C., the resulting product is filtered off and is washed on the same filter with cold water.

After oven drying at 100° C., 114 g of intermediate (XVI):

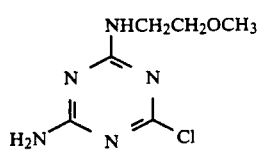

are obtained as a white crystalline powder having m.p. 195°–197° C., and a chlorine content of 17.18% (theoretical chlorine content: 17.44%).

500 cm³ of xylene, 81.4 g of intermediate (XVI) and 17.2 g of piperazine are charged to the same reactor of 1 liter of capacity.

The resulting mixture is heated up to 100° C. and is kept 2 hours at that temperature.

Then, 16 g of sodium hydroxide are added and the temperature of the reaction mixture is increased up to boiling temperature. The reaction mixture is kept refluxing for approximately 20 hours, then is cooled down to room temperature, and the resulting precipitate is filtered off.

The filter cake is washed with plentiful water and is dried.

74.2 g of intermediate (XVII):

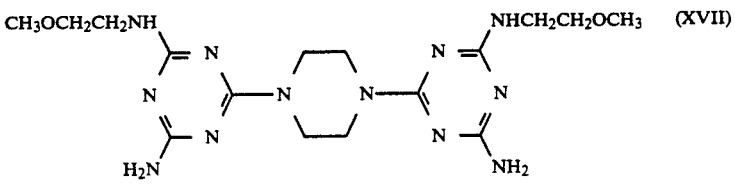

with m.p.=212°–215° C. are obtained.

The structure of intermediates (XV), (XVI) and (XVII) was confirmed by I.R. spectroscopic analysis.

450 cm,3 of water, 64.8 g of an aqueous solution at 37% of formaldehyde, 0.7 g of sodium carbonate and, with stirring, 84.0 g of intermediate (XVII) are charged to the same reactor of one liter of capacity.

The reaction mass is heated up to 70° C., and is kept stirred at that temperature for five hours.

Then, 3.0 g of sulfuric acid diluted with 10 cm³ of water are added.

The reaction mass is heated up to boiling temperature, and is kept under refluxing conditions for five hours.

Then, 200 cm³ of water are added, with the temperature of the reaction mixture being allowed to decrease down to 60° C., and the reaction mixture is subsequently neutralized by means of the addition of 2.4 g of sodium carbonate.

The reaction mixture is kept at 60° C. for one further hour, then the resulting product is filtered off, and the filter cake is washed on the same filter with hot water.

By oven drying the filter cake at 100° C. and subsequently submitting it to a thermal treatment at 150° C. for 2 hours, under vacuum, 92.2 g of resin are obtained as a white crystalline powder, having a higher melting point than 300° C.

EXAMPLE 2

184.5 g of cyanuric chloride and 1300 cm³ of methylene chloride are charged to the same equipment of 3 liters of capacity as disclosed in Example 1.

Then, by proceeding as disclosed in Example 1, but using 87.2 g of morpholine, 230 g of intermediate (XVIII):

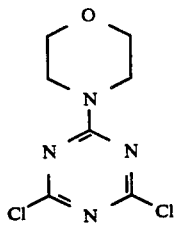

(XVIII)

are obtained as a white crystalline powder with m.p.=155°-157° C. and a chlorine content of 29.87% (theoretical value: 30.12%).

100 g of a solution at 30% by weight of ammonia, 100 cm³ of water and 70.5 g of intermediate (XVIII) are charged to a reactor of 0.5 liter of capacity, equipped as in Example 1.

The reaction mixture is heated up to 50° C. and is kept 7 hours at this temperature; then, the reaction mixture is allowed to coot down to room temperature, the obtained product is filtered off and the filter cake is washed with water.

By drying the filter cake, 58 g of intermediate (XIX):

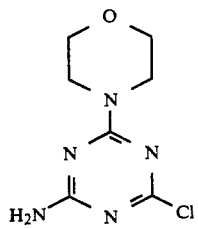

(XIX)

are obtained as a white crystalline powder with m.p. 189°-19° C. and a chlorine content of 16.28% (theoretical value: 16.47%).

400 cm³ of ortho-dichlorobenzene, 53.9 g of intermediate (XIX) and 14.5 g of hexamethylenediamine are added to a reactor of 1 liter of capacity, fitted as the one disclosed hereinabove.

The resulting mixture is heated up to 100° C., and is kept 2 hours at that temperature. Then, 10 g of sodium hydroxide are added and the resulting mixture is heated up to 140° C. The reaction mixture is kept 16 hours at 140° C., then is cooled down to room temperature and the resulting product is filtered off and the filter cake is washed with plentiful water.

After drying, 62.3 g of intermediate (XX):

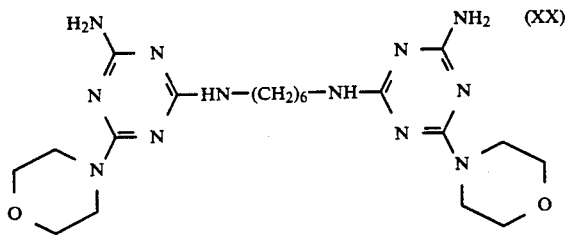

(XX)

are obtained as a white crystalline powder having m.p.=267°-269° C.

The structure of compounds (XVIII), (XIX) and (XX) was confirmed by I.R. spectroscopic analysis.

400 cm³ of water, 50.7 g of an aqueous solution at 37% of formaldehyde, 0.5 g of sodium carbonate and, with stirring, 59.2 g of intermediate (XX) are charged to the same reactor of one liter of capacity.

The reaction mass is heated up to 65° C., and is kept stirred at that temperature for 4 hours.

Then, 3.0 g of sulfuric acid are added, the reaction mass is heated up to boiling temperature, and is kept under refluxing conditions for 4 hours.

Then, 200 cm³ of water are added, with the reaction temperature being allowed to decrease down to 50° C., and the reaction mixture is subsequently neutralized by means of the addition of 2.6 g of sodium carbonate.

Then, by proceeding as disclosed in Example 1, 64.1 g of resin are obtained as a white crystalline powder having a melting point higher than 300° C.

EXAMPLE 3

184.5 g of cyanuric chloride and 800 cm³ of acetone are charged to a reactor of 3 liters of capacity, equipped with stirrer, thermometer, addition funnel, reflux condenser and heating bath.

With stirring, the reaction mixture is heated up to 40° C. in order to obtain a solution, then, with the temperature being kept at 40° C., 284 g of an aqueous solution of ammonia at 30% by weight is added during a 1 hour and 30 minute time.

The reaction mixture is subsequently heated up to 45° C. and is kept 4 hours at this temperature.

After cooling, the resulting product is filtered off and is washed on the filter with water.

After oven drying at 50°-60° C. under vacuum, 113 g of intermediate (XXI):

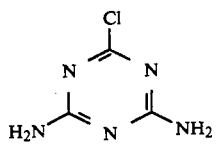

(XXI)

are obtained as a white, infusible, crystalline powder containing 24.2% of chlorine (theoretical chlorine content=24.4%).

400 cm³ of xylene, 58.2 g of intermediate (XXI) and 17.2 g of piperazine are charged to a reactor of 1 liter of capacity, fitted as the preceding one.

The reaction mass is heated up to 100° C., and is kept 2 hours at this temperature.

Then, 16 g of sodium hydroxide in solid state are added and the resulting mixture is heated up to boiling temperature.

The reaction mixture is allowed to reflux for approximately 20 hours, then is cooled down to room temperature and is filtered.

The filter cake is washed with plentiful water and is dried. 54.2 g of intermediate (XXII):

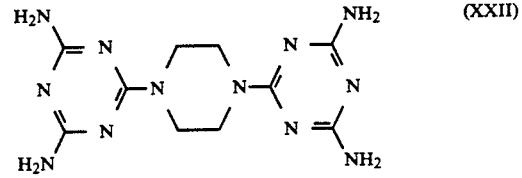

(XXII)

are obtained as a white crystalline powder having a higher m.p. than 300° C.

The structure of compounds (XXI) and (XXII) was confirmed by I.R. spectroscopic analysis.

400 cm³ of water, 0.9 g of potassium carbonate, 72.9 g of an aqueous solution at 37% by weight of formaldehyde and, with stirring, 45.6 g of intermediate (XXII) are charged to the same reactor of one liter of capacity.

The reaction mass is heated up to 70° C., and is kept stirred at that temperature for 6 hours.

Then, 3.0 g of sulfuric acid are added, the reaction mass is heated up to boiling temperature, and is kept under refluxing conditions for 6 hours.

Then, 150 cm³ of water are added, with the reaction temperature being allowed to decrease down to 60° C., and the reaction mixture is subsequently neutralized by means of the addition of 3.1 g of potassium carbonate.

The reaction mixture is kept at 60° C. for a further hour, than the resulting product is filtered off, and the filter cake is washed on the same filter with hot water.

After oven drying the filter cake at 100° C. and submitting it to thermal treatment, 52,0 g of resin are obtained as a white crystalline powder having a higher m.p. than 300° C.

EXAMPLE 4

184.5 g of cyanuric chloride and 700 cm³ of water are charged to a reactor of 2 liters of capacity, equipped with stirrer, thermometer, addition funnel reflux condenser and cooling bath. While cooling from the outside, 85 g of piperidine and 40 g of sodium hydroxide dissolved in 150 cm³ of water are fed simultaneously during a 3 hour time, with the pH value of the mixture being kept comprised within the range of from 5 to 7.1 and the temperature being kept comprised within the range of from 0° to 3° C.

The reaction mixture is kept at the temperature of 0°-3° C. for a further 2 hours, then the resulting product is filtered off and is washed on the filter with water.

By drying the filter cake in an oven at 50° C., under vacuum, 216.4 g of intermediate (XXIII):

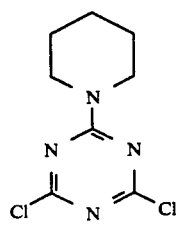

(XXIII)

are obtained as a white crystalline powder with m.p.=73°-75° C., and a chlorine content of 30.26% (theoretical chlorine content: 30.47%).

200 g of a solution of ammonia at 30% by weight and 500 cm³ of water are charged to a reactor of 1 liter of capacity, fitted as in Example 1.

The reaction mixture is heated up to 40° C. and then, during a 30 minute time, 139.8 g of intermediate (XXIII) are added, with the reaction temperature being kept at 40° C.

The reaction temperature is increased up to 45° C. and is kept at that value for approximately 6 hours.

At the end, the reaction is cooled down to room temperature and the resulting product is filtered off. The filter cake is washed with water and is dried.

123 g of intermediate (XXIV):

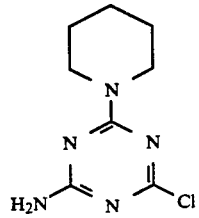

(XXIV)

are obtained as a white crystalline powder having m.p. 165°-168° C. and containing 16.29% of chlorine (theoretical chlorine content: 16.63%).

The structure of intermediates (XXIII) and (XXIV) was confirmed by NMR analysis.

600 cm³ of xylene, 96.1 g of intermediate (XXIV) and 15.4 g of diethylene triamine are charged to the same reactor of 1 liter of capacity.

The reaction mixture is heated up to 100° C. and is kept at that temperature for 2 hours. Then, 18 g of sodium hydroxide are added and the resulting mixture is heated up to boiling temperature.

The reaction mass is kept under refluxing conditions for 24 hours, then is cooled down to room temperature, the resulting product is filtered off and the filter cake is washed with water.

By oven drying at 100° C, 93.1 g of intermediate (XXV):

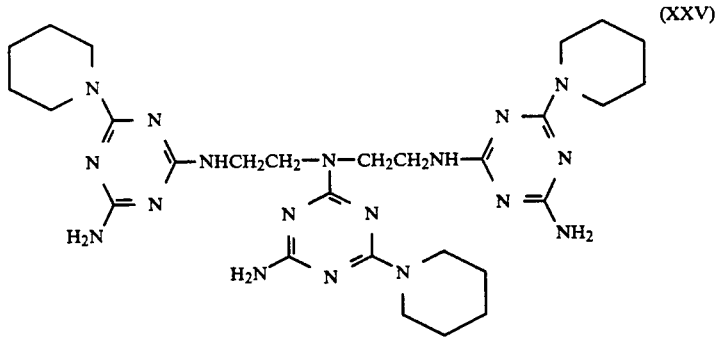

(XXV)

are obtained as a white crystalline powder with m.p.=259°-262° C.

The structure of intermediate (XXV) is furthermore confirmed by I.R. spectroscopic analysis.

400 cm³ of water, 64.9 g of a solution at 37% by weight of formaldehyde and, with stirring, 63.4 g of intermediate (XXV) are charged to the same reactor of one liter of capacity.

The reaction mixture is heated up to 60° C. and is kept stirred at that temperature for 4 hours.

Then, 3.7 g of an aqueous solution at 37% by weight of hydrochloric acid are added, the reaction mixture is heated up to boiling temperature and is caused to reflux for 6 hours.

Then, 200 cm³ of water are added, the reaction temperature is allowed to decrease down to 50° C. and the mixture is neutralised by means of the addition of 1.5 g of sodium hydroxide.

The reaction mixture is kept for a further hour at 50° C., than the resulting product is filtered off, and the filter cake is washed on the same filter with hot water.

Then, by subsequently proceeding as disclosed in the above Examples, 71.2 g of resin are obtained as a white crystalline powder having a melting point higher than 300° C.

EXAMPLE 5

600 cm³ of xylene, 107.8 g of intermediate (XIX) and 21.5 g of piperazine are charged to a reactor of one liter of capacity equipped as Example 2.

Then, by proceeding as disclosed in Example 2, 106.1 g of intermediate (XXVI):

(XXVI)

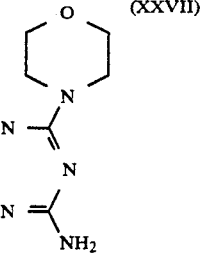

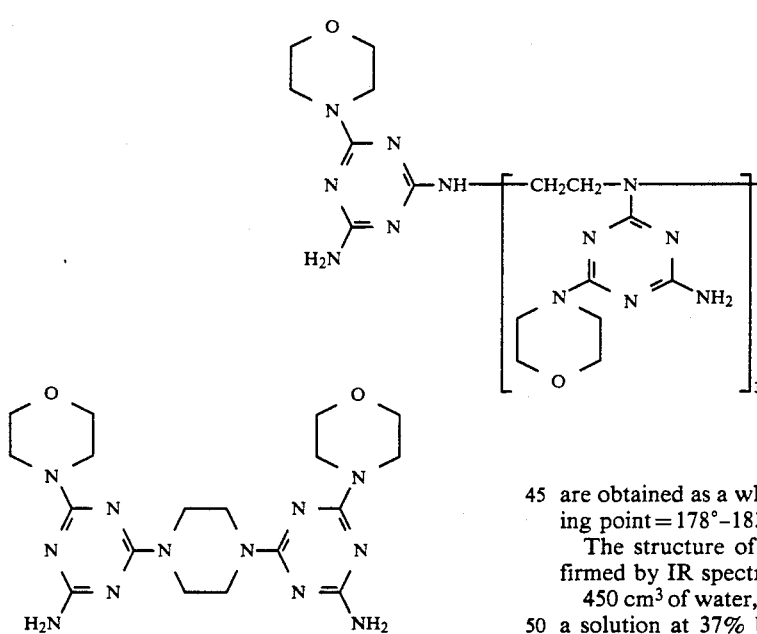

are obtained as a white crystalline powder having melting point=280°-285° C.

The structure of intermediate (XXVI) was confirmed by IR spectroscopic analysis.

150 cm³ of methanol, 100 cm³ of water, 129.7 g of a solution at 37% by weight of formaldehyde and, with stirring, 66.6 g of intermediate (XXVI) and 31.5 g of 2,4,6-triamino-1,3,5-triazine (melamine) are charged to the same reactor of one liter of capacity.

The reaction mixture is heated up to 60° C. and is kept with stirring at that temperature for 4 hours.

Then, 2.9 g of phosphoric acid at 85% by weight diluted with 10 cm³ of water are added, the reaction mixture is heated up to boiling temperature and is kept refluxing for approximately 10 hours.

Then 300 cm³ of water are added, with the temperature being allowed to decrease down to 50° C., and the mixture is neutralized by means of the addition of 4.3 g of potassium hydroxide.

The reaction mixture is kept at 50° C. for a further hour, then the resulting product is filtered off, and the filter cake is washed on the same filter with hot water.

Then, by proceeding according to the operating modalities as disclosed in the preceding Examples, 112.4 g of resin are obtained as a white crystalline powder, having a melting temperature higher than 300° C.

EXAMPLE 6

500 cm³ of xylene, 86.2 g of intermediate (XIX) and 15.1 g of tetraethylenepentaamine are charged to a reactor of one liter of capacity, equipped as in the preceding Examples.

The reaction mixture is heated up to 80° C. and is kept at that temperature for two hours. Then, 16 g of sodium hydroxide are added, and the reaction temperature is increased up to 110° C.

The reaction mass is kept at 100° C. for 18 hours, then is cooled down to room temperature, and the resulting product is filtered off, with the filter cake being washed with plentiful water on the same filter.

After drying the filter cake in an oven at 100° C., 82.6 g of intermediate (XXVII):

are obtained as a white crystalline powder having melting point=178°-183° C.

The structure of intermediate (XXVII) is also confirmed by IR spectroscopic analysis.

450 cm³ of water, 0.5 g of sodium carbonate, 46.6 g of a solution at 37% by weight formaldehyde and, with stirring, 54.2 g of intermediate (XXVII) are charged to the same reaction equipment of 1 liter of capacity.

By operating analogously to as disclosed in the preceding Examples, the reaction mixture is heated 4 hours at 60° C., is acidified with 7.9 g of an aqueous solution at 48% by weight of hydrobromic acid and is kept 8 hours under refluxing conditions.

The reaction mixture is then diluted with 200 cm³ of water, is cooled down to 50° C., and is neutralized with 1.5 g of sodium hydroxide.

After filtering off the product, drying the filter cake and carrying out the thermal conditioning of the compound, 67.8 g of resin are obtained as a white crystalline powder having a higher melting point than 300° C.

EXAMPLE 7

450 cm³ of water, 91.6 g of intermediate (XVI) and, with stirring, 21.9 g of tris (2-aminoethyl) amine are charged to a reactor of 1 liter of capacity, equipped as disclosed in the preceding Examples.

The reaction mixture is heated up to 80° C. and is kept at that temperature for 3 hours.

Then 18 g of sodium hydroxide dissolved in 30 cm³ of water are added, and the reaction mixture is heated up to boiling temperature.

The reaction mixture is caused to reflux for 16 hours, then is cooled down to 10° C., and the resulting product is filtered off, with the filter cake being washed on the same filter with cold water.

By drying the filter cake in an oven at 100° C., 85.4 g of intermediate (XXVIII):

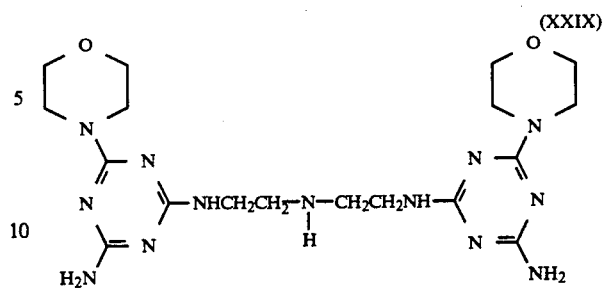

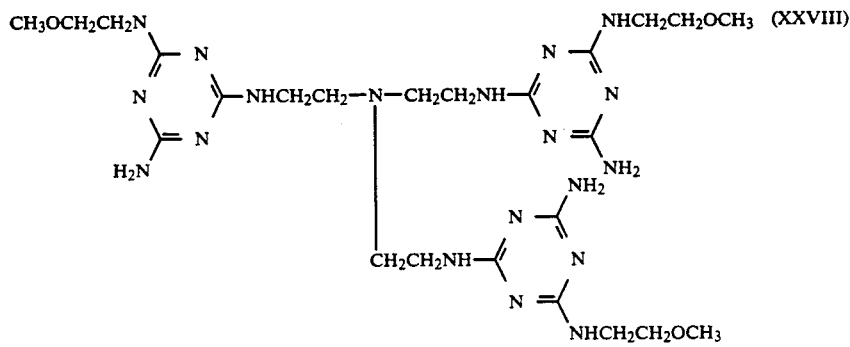

are obtained as a white crystalline powder, having melting point=190°-195° C.

The structure of intermediate (XXVIII) was also confirmed by NMR analysis.

300 cm³ of water, 0.7 g of sodium carbonate, and, with stirring, 24.0 g of paraformaldehyde and 64.7 g of intermediate (XXVIII) are charged to the same reactor of 1 liter of capacity.

The reaction mixture is heated up to 45° C. and is kept at that temperature for 6 hours.

Then, 3.0 g of sulfuric acid at 96% are added, the resulting mixture is heated up to boiling temperature and is caused to reflux for approximately 8 hours.

250 cm³ of water are added, the resulting mixture is cooled down to 45° C. and is neutralized by means of the addition of 2.4 g of sodium carbonate.

Then, by proceeding as disclosed in the preceding Examples, 72.9 g of resin are obtained as a white crystalline powder having a higher m.p. than 300° C.

EXAMPLE 8

400 cm³ of water, 86.2 g of intermediate (XIX) and 20.6 g of diethylenetriamine are charged to the same equipment of 1 liter of capacity, as of the preceding Example.

The reaction mass is heated at 80° C. for two hours, then 16 g of sodium hydroxide dissolved in 30 cm³ of water are added, and the reaction mixture is heated up to boiling temperature.

The reaction mixture is caused to reflux for approximately 14 hours, then, by proceeding as disclosed in the preceding Example, 86,2 g of intermediate (XXIX):

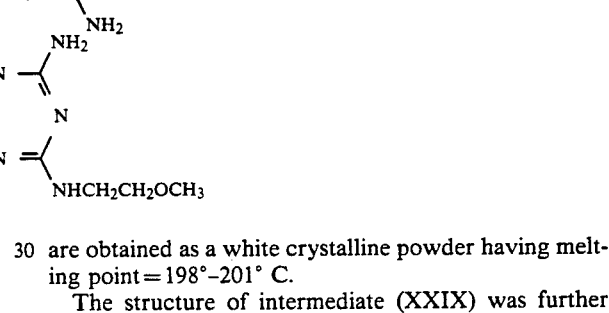

are obtained as a white crystalline powder having melting point=198°-201° C.

The structure of intermediate (XXIX) was further confirmed by IR spectroscopic analysis.

350 cm³ of water, 77.9 g of a solution at 37% by weight of formaldehyde and, with stirring, 73.8 g of intermediate (XXIX) are charged to the same reactor of 1 liter of capacity.

The reaction mixture is heated up to 50° C. and is kept at that temperature for 3 hours.

The resulting mixture is acidified with 4.1 g of hydrochloric acid at 37% by weight, the mixture is heated up to boiling temperature and is caused to reflux for 4 hours.

Then 250 cm³ of water are added, the resulting mixture is allowed to coot down to 60° C., and is neutralized by means of the addition of 2.2 g of potassium carbonate.

By proceeding as in the preceding Examples, 85.8 g of resin are obtained as a crystalline powder of white colour having a higher melting point than 300° C.

EXAMPLE 9

184.5 g of cyanuric chloride and 700 cm³ of water are charged to a reactor of 2 liters of capacity, equipped as in Example 4.

With external cooling, 133 g of bis-(2-methoxyethyl) amine and 40 g of sodium hydroxide dissolved in 150 cm³ of Water are added simultaneously during a 3 hours time, with the pH value of the reaction mixture being kept comprised within the range of from 5 to 7 and the reaction temperature within the range of from 0° to 3° C.

The reaction mixture is kept at the temperature of 0°-3° C. for a further two hours, then the resulting product is filtered off and the filter cake is washed on the filter with cold water.

By oven drying the filter cake at 50° C. under vacuum, 254.3 g of intermediate (XXX):

(XXX)

sulting product is filtered off, with the filter cake being washed with plentiful water.

By oven drying at 100° C., 126.1 g of intermediate (XXXII):

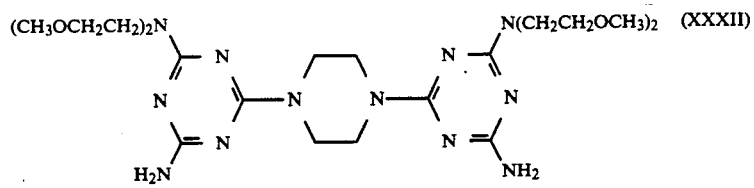

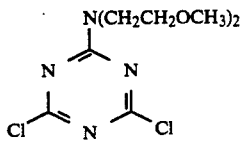

are obtained as a white crystalline powder having melting point=63°-65° C., and containing 25.06% of chlorine (theoretical chlorine content: 25.27%).

200 g of a solution of ammonia at 30% by weight and 500 cm³ of water are charged to a reactor of one liter of capacity, equipped as in the preceding Examples.

The reaction mixture is heated up to 40° C. and then 168.6 g of intermediate (XXX) are added, during a 30 minute time, with the reaction temperature being kept at 40° C.

The reaction temperature is increased up to 45° C. and is kept at that value for approximately 6 hours.

At the end, the reaction mixture is cooled down to the temperature of 10° C., the resulting product is filtered off, and the filter cake is washed on the same filter with cold water.

By oven drying the filter cake, 139.4 g of intermediate (XXXI):

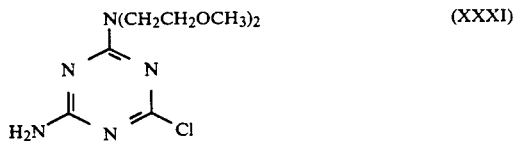

are obtained as a white crystalline powder having melting point 87°-88° C. and containing 13.39% of chlorine (theoretical chlorine content: 13.57%).

The structure of intermediates (XXX) and (XXXI) was further confirmed by NMR analysis.

600 cm³ of xylene, 130.8 g of intermediate (XXXI) and 21.5 g of piperazine are charged to the same reactor of one liter of capacity.

The reaction mixture is heated up to 100° C. and is kept at that temperature for 2 hours. Then, 20 g of sodium hydroxide are added, and the resulting mixture is heated up to boiling temperature.

The reaction mixture is caused to reflux for 24 hours, then is cooled down to room temperature, and the reare obtained as a white crystalline powder having melting point=168°-170° C.

The structure of intermediate (XXXII) is furthermore confirmed by IR spectroscopic analysis.

350 cm³ of water, 0.5 g of sodium carbonate, 32.5 g of a solution at 37% by weight of formaldehyde and, with stirring, 53.6 g of intermediate (XXXII) are charged to the same reactor of one liter of capacity.

The reaction mass is heated up to 65° C. and is kept 5 hours at that temperature, with stirring.

Then, 3.0 g o f sulfuric acid are added, t h e reaction mixture is heated up to boiling temperature, and is caused to reflux of 5 hours.

250 cm³ of water are added, with t h e reaction temperature being allowed to decrease down to 50° C. and the resulting mixture is neutralized by means of the addition of 2.6 g of sodium carbonate.

The reaction mixture is kept at 50° C. for a further hour, then the resulting product is filtered off, and the filter cake is washed on the same filter with hot water.

Then, by subsequently proceeding as disclosed in the preceding Examples, 55.1 g of resin are obtained as a white crystalline powder having a melting temperature higher than 300° C.

EXAMPLES 10-22

By operating under analogous conditions to as disclosed in Examples from 1 to 9, the resins of melaminic derivatives of general formula (I), either containing, or not containing, polyaminic compounds, as reported in Table 2 and having higher melting points than 300° C. are prepared by polymerization with formaldehyde. In such structures, the radical $R_3$, when present, is replaced by the triazinic ring of formula:

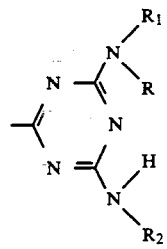

TABLE 2

DERIVATIVE OF GENERAL FORMULA (I)

$$-Z-\left[\underset{[Z_2]_a}{\overset{N-Z_1}{|}}\right]_b$$

| EXAMPLE N° | R—N—R₁ | R₂ | -Z-[N-Z₁/[Z₂]ₐ]ᵦ | Polyaminic derivative Designation | % by weight | R₄ | R₄—CHO Mol % | Molar ratio polyamines/aldehydes |
|---|---|---|---|---|---|---|---|---|
| 10 | thiomorpholine (N,S ring) | H | —HNC₂H₄—N—C₂H₄NH— | — | — | — | — | 1:6 |
| 11 | n-C₄H₉ | H | piperazine (N,N ring) | — | — | — | — | 1:8 |
| 12 | H | H | —HNCH₂CH₂NH— | — | — | — | — | 1:10 |
| 13 | morpholine (N,O ring) | H | piperazine (N,N ring) | — | — | — | — | 1:2 |
| 14 | (CH₂)₂OCH=CH₂ | H | piperazine (N,N ring) | — | — | — | — | 1:5 |
| 15 | H | H | —HNC₂H₄—N—C₂H₄NH— | — | — | — | — | 1:12 |
| 16 | CH₂CH₂OCH₃ | H | piperazine (N,N ring) | Ethyleneurea | 40 | — | — | 1:2 |
| 17 | morpholine (N,O ring) | H | cyclohexane-1,3-bis(CH₂NH—) | — | — | — | — | 1:4 |

TABLE 2-continued

DERIVATIVE OF GENERAL FORMULA (I)

$$-Z-\left[N-Z_1\atop{[Z_2]_a}\right]_b$$

| EXAMPLE N° | R—N—R$_1$ | | R$_2$ | Polyaminic derivative Designation | % by weight | R$_4$—CHO R$_4$ | Mol % | Molar ratio polyamines/ aldehydes |
|---|---|---|---|---|---|---|---|---|
| | R | R$_1$ | | | | | | |
| 18 | (CH$_2$)$_3$OCH$_3$ | H | H | — | — | — | — | 1:4 |
| 19 | \[thiomorpholine\] | | H | —HN—⟨C$_6$H$_4$⟩—COHN—⟨C$_6$H$_4$⟩—NH | — | — | — | 1:3.5 |
| 20 | (CH$_2$)$_2$O(CH$_2$)$_2$OH | H | H | —NCH$_2$CH$_2$HN— / —CH$_2$CH$_2$OH | — | — | — | 1:6 |
| 21 | CH$_2$—CH=CH$_2$ | H | H | \[piperazine\] | — | — | — | 1:4 |
| 22 | CH$_2$CH$_2$OCH$_3$ | CH$_2$CH$_2$OCH$_3$ | H | \[piperazine\] Melamine | 41 | — | — | 1:5 |

Tables 3 and 4

The tests reported in the above said tables relate to polymeric compositions containing the products of general formula (I) prepared according to the preceding examples.

Specimens were prepared as slabs having a thickness of approximately 3 mm, by moulding compounds consisting of granular polymer and additives, on a platen press MOORE, with a moulding time of 7 minutes, by operating under a pressure of 40 kg/cm².

On the resulting stabs, the level of self-extinguishment is determined by measuring the respective values of Oxygen Index (L.O.I. according to ASTM D-2863/77) on a STANTON REDCROFT instrument, and applying the "Vertical Burning Test", which makes it possible the material to be classified at the three levels 94 V-0, 94 V-1 and 94 V-2 according to UL 94 standards (published by "Underwriters Laboratories"—USA).

In Table 3, the values are reported which were obtained by using isotactic polypropylene flakes having a Melt Flow Index equal to 12, and containing 96% of insolubles in boiling n-heptane, by weight.

In Table 4, the values are reported which were obtained by using a low density polyethylene in granular form having a Melt Flow Index of 7; a granular polystyrene containing 5% by weight of polybutadienic rubber and having a Melt Flow Index equal to 9; a thermoplastic polyester polyurethane (ESTANE 54600® ex Goodrich), and a thermoplastic polyether polyurethane (ESTANE 58300® ex Goodrich), both in granular form, having specific gravity values of 1.19 and 1.10 g/cm³, respectively; an elastomeric ethylenepropylene copolymer containing 45% by weight of propylene; an acrylonitrile-butadiene-styrene terpolymer having a specific gravity of 1.06 g/cm³, a Melt Flow Index of 1.6 and containing approximately 40% of acrylonitrile and styrene and 20% of butadiene.

TABLE 3

| Example No. | Product of Example No. | Pro-duct | PP (1) | AO (2) | APP (1) | L.O.I. (ASTM D 2863) | UL94 3 mm |
|---|---|---|---|---|---|---|---|
| 23 | 1 | 6.6 | 76 | 1 | 16.4 | 35.0 | V0 |
| 24 | 2 | 5.2 | 78 | 1 | 15.8 | 32.4 | V0 |
| 25 | 3 | 4.7 | 78 | 1 | 16.3 | 34.2 | V0 |
| 26 | 4 | 6.0 | 75 | 1 | 18.0 | 32.7 | V0 |
| 27 | 5 | 5.3 | 78 | 1 | 18.7 | 31.7 | V0 |
| 28 | 6 | 7.0 | 75 | 1 | 14.0 | 32.2 | V0 |
| 29 | 7 | 7.2 | 75 | 1 | 16.8 | 35.0 | V0 |
| 30 | 8 | 17.0 | 65 | 1 | 17.0 | 38.6 | V0 |
| 31 | 9 | 6.0 | 75 | 1 | 18.0 | 32.1 | V0 |
| 32 | 10 | 8.0 | 75 | 1 | 16.0 | 33.8 | V0 |
| 33 | 11 | 7.2 | 73 | 1 | 18.8 | 30.8 | V0 |
| 34 | 12 | 4.0 | 77 | 1 | 18.0 | 30.9 | V0 |
| 35 | 13 | 7.0 | 78 | 1 | 14.0 | 33.4 | V0 |
| 36 | 14 | 6.0 | 75 | 1 | 18.0 | 33.2 | V0 |
| 37 | 15 | 6.0 | 75 | 1 | 18.0 | 31.9 | V0 |
| 38 | 16 | 6.8 | 75 | 1 | 17.2 | 33.6 | V0 |
| 39 | 17 | 6.0 | 75 | 1 | 18.0 | 32.9 | V0 |
| 40 | 18 | 5.8 | 73 | 1 | 20.2 | 31.6 | V1 |
| 41 | 19 | 7.1 | 74 | 1 | 17.9 | 32.7 | V0 |
| 41 | 20 | 6.9 | 74 | 1 | 18.1 | 31.6 | V0 |
| 43 | 21 | 6.0 | 75 | 1 | 18.0 | 32.2 | V0 |
| 44 | 22 | 7.5 | 75 | 1 | 16.5 | 30.8 | V0 |
| 45 | 2 | 6.9 | 75 | 1 | 17.1(*) | 34.4 | V0 |
| 46 | 6 | 7.8 | 72 | 1 | 19.2(*) | 37.8 | V0 |
| 47 | 10 | 6.7 | 75 | 1 | 17.3(3) | 34.9 | V0 |
| 48 | 13 | 6.0 | 75 | 1 | 18.0(4) | 33.4 | V0 |

(1) PP = polypropylene
APP = ammonium polyphosphate Exolit 422(R) (Hoechst)
*App microencapsulated with melamineformaldehyde resin Exolit 462(R) (Hoechst)
(2) AO = antioxidant
A mixture constituted by 2 parts of dilauryl thiopropionate and 1 part of pentaerythritol tetra [3-(3,5-di-tert-butyl-4-hydroxyphenyl) propionate].
(3) App was replaced with monoammonium salt of ethane-1-amino-1, 1-diphosphonic acid.
(4) APP was replaced with monoammonium salt of ethane-1-hydroxy-1, 1-diphosphonic acid.

TABLE 4

| Example No. | Polymeric Support (1) | Product of Example No. | Product | Polymer | AO (2) | APP (1) | L.O.I. (ASTM D 2863) | UL94 3 mm |
|---|---|---|---|---|---|---|---|---|
| 49 | LDPE | 1 | 7.3 | 70 | 1 | 21.7 | 31.2 | V0 |
| 50 | LDPE | 8 | 8.3 | 70 | 1 | 20.7 | 32.8 | V0 |
| 51 | LDPE | 10 | 7.3 | 70 | 1 | 21.7 | 32.4 | V0 |
| 52 | HIPS | 1 | 9.1 | 67 | 1 | 22.9 | 30.8 | V0 |
| 53 | HIPS | 10 | 8.0 | 67 | 1 | 24.0 | 31.0 | V0 |
| 54 | (ester) PU | 2 | 7.3 | 70 | 1 | 21.7 | 31.9 | V0 |
| 55 | (ester) PU | 3 | 7.3 | 70 | 1 | 21.7 | 35.5 | V0 |
| 56 | (ester) PU | 6 | 8.3 | 70 | 1 | 20.7 | 33.8 | V0 |
| 57 | (ester) PU | 13 | 7.3 | 70 | 1 | 21.7 | 32.6 | V0 |
| 58 | (ether) PU | 2 | 9.1 | 67 | 1 | 22.9 | 30.4 | V0 |
| 59 | (ether) PU | 10 | 7.8 | 68 | 1 | 23.2 | 31.7 | V0 |
| 60 | PP/PE | 1 | 8.9 | 68 | 1 | 22.1 | 31.8 | V0 |
| 61 | PP/PE | 10 | 7.3 | 70 | 1 | 21.7 | 35.2 | V0 |
| 62 | PP/PE | 13 | 8.5 | 65 | 1 | 25.5 | 34.8 | V0 |
| 63 | ABS | 13 | 10.3 | 68 | 1 | 20.7 | 30.5 | V0 |

(1) APP = ammonium polyphosphate Exolit 422(R) (Hoechst)
LDPE = Low density polyethylene
HIPS = polystyrene containing 5% of butadiene rubber
(ester) PU = polyester polyurethane
(ether) PU = polyether polyurethane
PP/PE = propylene-ethylene copolymer
ABS = acrylonitrile-butadiene-styrene terpolymer
(2) AO = antioxidant
A mixture constituted by 2 parts of dilauryl thiopropionate and 1 part of pentaerythritol tetra [3-(3,5-di-tert-butyl-4-hydroxyphenyl)-propionate].

EXAMPLE 64 (COMPARISON EXAMPLE)

200 cm³ of water, 122 g of a solution at 37% by weight of formaldehyde and, with stirring, 63.0 g of 2,4,6-triamine-1,3,5-triazine (melamine) are charged to a reactor of 0.5 liter of capacity, equipped as disclosed hereinabove in Example 1.

The reaction mass is heated at 60° C. for 20 minutes, until a solution is obtained.

Such a solution, kept at 60° C., is added, during approximately 1 hour, to a 2 liter reactor, equipped as in Example 11 containing 500 cm³ of water and 1.9 g of sulfuric acid ar 96%, heated at 90° C.

A white precipitate is formed.

The reaction mass is kept at 90° C. during 3 hours.

400 cm³ of water are added, with the reaction temperature being allowed to decrease down to 60° C., and the dispersion is subsequently neutralized by means of the addition of 2.0 g of sodium carbonate.

The dispersion is kept heated at 60° C. for a further hour, then the resulting product is filtered off, and the filter cake is washed on the same filter with hot water.

By drying the filter cake in an oven at 100° C. and submitting the dried cake to a subsequent thermal treatment at 150° C. for 2 hours under vacuum, 78 g of resin are obtained as a white crystalline powder having a melting point higher than 300° C.

By operating according to the same modalities as used in Examples Nos. 23–48, using the resin obtained as said above, the following composition is prepared:

| | |
|---|---|
| polypropylene: | 75 parts by weight |
| antioxidant: | 1 part by weight |
| ammonium polyphosphate: | 17 parts by weight |
| melamine-formaldehyde resin | 7 parts by weight |

By using the above said composition, specimens were prepared, which were submitted to self-extinguishment tests according to the previously disclosed modalities.

The following results were obtained:

L.O.I. = 23.8

UL94 (3 mm) class B the specimen burns).

We claim:

1. A self-extinguishing polymeric composition comprising:
   (a) from 91 to 40 parts by weight of a thermoplastic polymer, or of a polymer endowed with elastomeric properties;
   (b) from 6 to 33 parts by weight of one or more ammonium or amine phosphate and/or phosphonates;
   (c) from 3 to 27 parts by weight of one or more aminoplastic resin(s), obtained by means of the polymerization of a mixture comprising:
   (1) from 0 to 50 parts by weight of one or more polyaminic derivatives;
   (2) from 50 to 100 parts by weight of one or more derivatives of 2,4,6-triamino-1,3,5-triazine having formula (I):

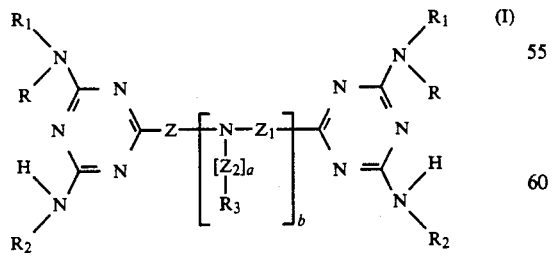

with formaldehyde or a mixture of formaldehyde and an aldehyde having formula (II):

wherein $R_4$ is $C_1-C_8$ alkyl; $C_2-C_6$ alkenyl; $C_6-C_{12}$ cycloalkyl; $C_6-C_{12}$ aryl optionally substituted by at least one $C_1-C_4$ alkyl; $C_7-C_{16}$ analkyl or $C_8-C_{12}$ aralkenyl; and wherein the alkdehyde having formula (II) can be present in an amount of up to 20% by mol, and wherein the radicals from R to $R_2$, which may be the same or different from each other, and may have different meanings on each trizinic ring, are: H; $C_1-C_{18}$ alkyl; $C_2-C_8$ alkenyl; $C_6-C_{16}$ cycloalkyl or alkylcycloalkyl, optionally substituted with a hydroxy or $C_1-C_4$ hydroxyalkyl function;

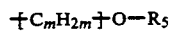

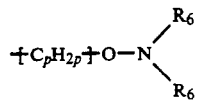

wherein:
m = an integer within the range of from 2 to 8;
p = an integer within the range of from 2 to 6;
$R_5$ = H; $C_1-C_8$ alkyl;

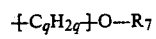

wherein q is an integer within the range of from 1 to 4 and $R_7$ is H or $C_1-C_4$ alkyl; $C_6-C_{12}$ cycloalkyl or aklylcycloalkyl;

the radicals $R_6$, which may be the same, or different from each other, are:

H, $C_1-C_8$ alkyl; $C_2-C_6$ alkenyl; $C_6-C_{12}$ cycloalkyl or alkylcycloalkyl; $C_1-C_4$ hydroxyalkyl; or the moiety;

is replaced by a heterocyclic radical linked to the alkyl chain through the nitrogen atom which is selected from the group consisting of aziridinyl, pyrrolidinyl, piperidinyl, morpholinyl, thiomorpholinyl, piperazinyl, 4-methylpiperazinyl and 4-ethylpiperazinyl or in formula (I) the moiety;

is replaced by a heterocyclic radical linked to the triazinic ring through the nitrogen atom, and optionally containing another heteroatom;

a is 0 (zero) or 1;

b is 0 (zero) or an integer within the range of from 1 to 5;

$R_3$ is hydrogen or:

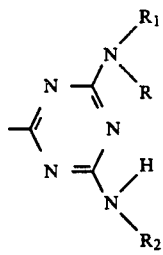

and its meaning may vary within each repeating unit; when b is 0 (zero), Z is a divalent radical falling within the scope of one of the following formulas:

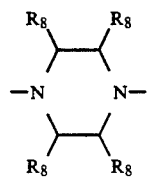  (III)

wherein the radicals $R_8$, which may be the same or different from each other, are hydrogen or $C_1$–$C_4$ alkyl;

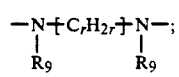  (IV)

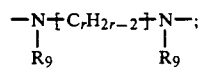  (V)

wherein r is an integer within the range of from 2 to 14; $R_9$ is hydrogen $C_1$–$C_4$ alkyl; $C_2$–$C_6$ alkenyl or $C_1$–$C_4$ hydroxyalkyl;

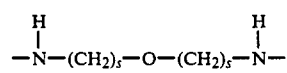  (VI)

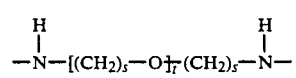  (VII)

wherein s is an integer within the range of from 2 to 5 and t is an integer within the range of from 1 to 3;

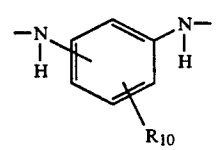  (VIII)

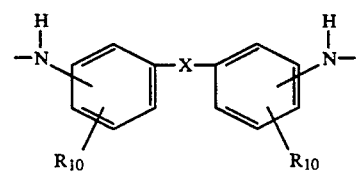  (IX)

wherein:
x is a direct C—C bond; O; S; S—S; SO; $SO_2$; NH; $NHSO_2$; NHCO; N=N; $CH_2$;

$R_{10}$ is hydrogen; hydroxy; $C_1$–$C_4$ alkyl; $C_1$–$C_4$ alkoxy;

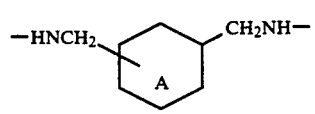  (X)

wherein A may be a saturated or unsaturated ring;

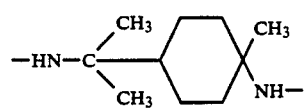  (XI)

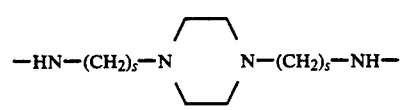  (XII)

wherein s has the above defined meaning; when, on the contrary, b is an integer within the range of from 1 to 5, the moiety:

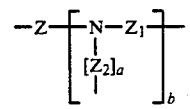

is a multivalent moiety falling within the scope of one of the following formulas:

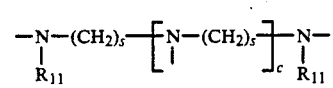  (XIII)

wherein:
$R_{11}$ is hydrogen or $C_1$–$C_4$ alkyl;
c is an integer within the range of from 1 to 5;
the indexes s, which may be the same, or different from each other, have the same meaning as defined hereinabove; or

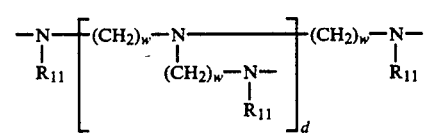  (XIV)

wherein:
$R_{11}$ has the meaning as defined hereinabove;
w is an integer within the range of from 2 to 4;
d is either 1 or 2.

2. The self-extinguishing polymeric compositions according to claim 1, in which the (c) component is selected from among polycondensates obtained by resinification with formaldehyde.

3. The self-extinguishing polymeric compositions according to claim 1, in which the (c) component is selected from among polycondensates obtained by means of resinification of the only melaminic derivatives of general formula (I).

4. The self-extinguishing polymeric compositions according to claim 1, in which $R_2$ and $R_3$, in general formula (I), are equal to hydrogen.

5. Self-extinguishing polymeric compositions according to claim 1, in which the moiety:

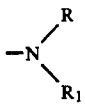

in general formula (I) is replaced by a heterocyclic radical selected from: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine.

6. Self-extinguishing polymeric compositions according to claim 1, in which at least one of radicals from R to $R_3$ in general formula (I) is a moiety:

$$-CH_2-[-C_mH_{2m}-]-O-R_5$$

wherein:
m is an integer comprised within the range of from 1 to 3 and
$R_5$ is hydrogen or $C_1-C_4$ alkyl.

7. The self-extinguishing polymeric compositions according to claim 1, in which the radical $R_4$ is selected from: methyl; ethyl; n-propyl; isopropyl; n-butyl; isobutyl; tert -butyl; n-pentyl; isopentyl; n-hexyl; n-heptyl; isoheptyl; n-octyl; ethenyl; propenyl; isobutenyl; sec -butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; 2-phenylethenyl.

8. The self-extinguishing polymeric compositions according to claim 1, in which ammonium phosphate or phosphates (b) have the general formula $$(NH_4)_{n+2}P_nO_{3n+1}$$

in which n is an integer equal to, or higher than, 2.

9. The self-extinguishing polymeric compositions according to any of claims from 1 to 7, in which ammonium phosphate or phosphates (b) have the general formula $$(NH_4PO_3)_n$$

in which n is a numeral comprised within the range of from 50 to 500.

10. Self-extinguishing polymeric compositions according to claim 1, in which amine phosphate(s) (b) are selected from dimethylammonium or diethylammonium phosphate; ethylenediamine phosphate; metamine ortho- or pyrophosphate.

11. Self-extinguishing polymeric compositions according to claim 1, in which ammonium phosphonate(s) (b) are mono- and polysubstituted ammonium phosphonates and are selected from salts deriving from mono- and polyphosphonic acids.

12. Self-extinguishing polymeric compositions according to claim 1, in which polymer (a) is selected from polymers or copolymers of olefins having the general formula $$R-CH=CH_2$$

wherein R is a hydrogen atom or a $C_1-C_8$ alkyl or aryl radical; acrylonitrile/butadiene/styrene (ABS) and styrene/acrylonitrile (SAN) copolymers; polyurethane; poly (ethylene terephthalate); poly (butylene terephthalate); polyamides.

13. Self-extinguishing polymeric compositions according to claim 12, wherein olefinic polymers and copolymers are selected from:
1. isotactic or prevailingly isotactic polypropylene;
2. HDPE, LLDPE, LDPE polyethylene;
3. crystalline propylene copolymers with minor proportions of ethylene and/or other alpha-olefins, such as 1-butene, 1-hexene, 1-octene, 4-methyl-1-pentene;
4. heterophasic compositions comprising: (A) a homopolymeric propylene fraction, or one of copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene;
5. elastomeric ethylene copolymers with alpha-olefins, possibly containing minor proportions of a diene.

14. The self-extinguishing polymeric composition according to claim 1, wherein the polymeric derivative is a compound containing a 1,3,5-triazine ring or at least one carbonyl and/or thiocarbonyl moiety, said polyaminic derivative being selected from the group consisting of urea, ethylurea, propylurea, thiourea, ethylenethiourea, melamine, acetoguanamine, propionguanamine, butyroguanamine, isobutyroguanamine, caprinoguanamine, succinoguanamine, benzoguanamine, metamethylbenzoguanamine, benzylguanamine, hydantoin, piperazine-2,5-dione, and barbituric acid.

15. A molded article of manufacture prepared from the composition of claim 1.

* * * * *